United States Patent [19]

Hofmann et al.

[11] Patent Number: 5,543,123
[45] Date of Patent: *Aug. 6, 1996

[54] LOW PRESSURE FORMATION OF A UREA HYDROLYSATE FOR NITROGEN OXIDES REDUCTION

[75] Inventors: John E. Hofmann, Naperville, Ill.; Thure Von Harpe, Meerbusch, Germany; Daniel V. Diep, Aurora; M. Linda Lin, Naperville, both of Ill.

[73] Assignee: Nalco Fuel Tech, Naperville, Ill.

[*] Notice: The term of this patent shall not extend beyond the expiration date of Pat. No. 5,240,688.

[21] Appl. No.: 226,993

[22] Filed: Apr. 13, 1994

Related U.S. Application Data

[63] Continuation-in-part of Ser. No. 132,575, Oct. 6, 1993, abandoned, and a continuation-in-part of Ser. No. 820,907, Feb. 26, 1992, Pat. No. 5,399,325, and a continuation-in-part of Ser. No. 970,479, Nov. 2, 1992, abandoned, and a continuation-in-part of Ser. No. 54,104, Apr. 26, 1993, abandoned, which is a division of Ser. No. 561,154, Aug. 1, 1990, Pat. No. 5,240,688.

[51] Int. Cl.⁶ .................................................. C01B 21/00
[52] U.S. Cl. .......................................... 423/235; 423/239.1
[58] Field of Search .................................. 423/235, 239.1

[56] References Cited

U.S. PATENT DOCUMENTS

| | | | |
|---|---|---|---|
| 3,900,554 | 8/1975 | Lyon | 423/235 |
| 4,087,513 | 5/1978 | Schell | 423/437 |
| 4,119,702 | 10/1978 | Azubata et al. | 423/235 |
| 4,168,299 | 9/1979 | Schell | 423/358 |
| 4,208,386 | 6/1980 | Arand et al. | 423/235 |
| 4,325,924 | 4/1982 | Arand et al. | 423/235 |
| 4,719,092 | 1/1988 | Bowers | 423/235 |
| 4,731,233 | 3/1988 | Thompson et al. | 423/231 |
| 4,751,065 | 6/1988 | Bowers | 423/235 |
| 4,756,890 | 7/1988 | Tang et al. | 423/235 |
| 4,770,863 | 9/1988 | Epperly et al. | 423/235 |
| 4,777,024 | 10/1988 | Epperly et al. | 423/235 |
| 4,780,289 | 10/1988 | Epperly et al. | 423/235 |
| 4,803,059 | 2/1989 | Sullivan et al. | 423/235 |
| 4,842,834 | 6/1989 | Burton | 423/235 |
| 4,844,878 | 7/1989 | Epperly et al. | 423/235 |
| 4,851,201 | 7/1989 | Heap et al. | 423/235 |
| 4,861,567 | 8/1989 | Heap et al. | 423/235 |
| 4,863,704 | 9/1989 | Epperly et al. | 423/235 |
| 4,863,705 | 9/1989 | Epperly et al. | 423/235 |
| 4,865,827 | 9/1989 | Tachi et al. | 423/239 |
| 4,873,066 | 10/1989 | Epperly et al. | 423/235 |
| 4,877,591 | 10/1989 | Epperly et al. | 423/235 |
| 4,888,165 | 12/1989 | Epperly et al. | 423/235 |
| 4,902,488 | 2/1990 | Epperly et al. | 423/235 |
| 4,908,194 | 3/1990 | Hooper | 423/235 |
| 4,915,036 | 4/1990 | DeVita | 110/215 |
| 4,927,612 | 5/1990 | Bowers | 423/235 |
| 4,978,514 | 12/1990 | Hofmann et al. | 423/235 |
| 4,997,631 | 3/1991 | Hofmann et al. | 423/235 |
| 5,057,293 | 10/1991 | Epperly et al. | 423/235 |
| 5,139,754 | 8/1992 | Luftglass et al. | 423/235 |
| 5,240,688 | 8/1993 | von Harpe et al. | 423/235 |
| 5,286,467 | 2/1994 | Sun et al. | 423/239 |

FOREIGN PATENT DOCUMENTS

| | | |
|---|---|---|
| WO91/00134 | 1/1991 | European Pat. Off. . |
| WO92/02450 | 2/1992 | European Pat. Off. . |

*Primary Examiner*—Michael Lewis
*Assistant Examiner*—Thomas G. Dunn, Jr.
*Attorney, Agent, or Firm*—St. Onge Steward Johnston & Reens LLC

[57] ABSTRACT

The present invention relates to a process for the use of a urea hydrolysate for nitrogen oxides reductions. More particularly, the process involves forming a urea hydrolysate under conditions of low pressure and introducing the hydrolysate into a combustion effluent under conditions effective for the reduction of nitrogen oxides.

13 Claims, No Drawings

LOW PRESSURE FORMATION OF A UREA HYDROLYSATE FOR NITROGEN OXIDES REDUCTION

RELATED APPLICATIONS

This application is a continuation-in-part of U.S. patent application Ser. No. 08/132,575 entitled "Low Pressure Formation of a Urea Hydrolysate For Nitrogen Oxides Reduction", filed in the names of Hofmann, von Harpe and Diep on Oct. 6, 1993, now abandoned; U.S. patent application having Ser. No. 07/820,907 entitled "Nitrogen Oxides Reduction Using a Urea Hydrolysate", filed in the names of von Harpe, Pachaly, Lin, Diep and Wegrzyn on Feb. 26, 1992, now U.S. Pat. No. 5,399,325; U.S. patent application having Ser. No. 07/970,479 entitled "Process and Composition for Sorbent Reduction of $N_2O$", filed in the names of Lin, Hofmann and Sun on Nov. 2, 1991, now abandoned; and U.S. patent application having Ser. No. 08/054,104 entitled "Process for the In-Line Hydrolysis of Urea", filed in the names of von Harpe and Pachaly on Apr. 26, 1993, now abandoned, which in turn is a divisional of No. 07/561,154 entitled "Process for the In-Line Hydrolysis of Urea", filed in the names of von Harpe, Pachaly and Hofmann on Aug. 1, 1990, now U.S. Pat. No. 5,240,688, the disclosures of each of which are incorporated herein by reference.

TECHNICAL FIELD

The present invention relates to a process for the reduction of nitrogen oxides (NOx, where x is an integer, generally 1 or 2) in a combustion effluent (also commonly referred to as flue gas, exhaust gas, gas exhaust, tail gas and waste gas) by the use of the hydrolysis products of urea, which provides advantages over conventional NOx reducing processes, Carbonaceous fuels can be made to burn more completely and with reduced emissions of carbon monoxide and unburned hydrocarbons when the oxygen concentrations and air/fuel ratios employed are those which permit high flame temperatures. When fossil fuels are used in suspension fired boilers, such as large utility boilers, temperatures above about 2000° F. and typically about 2200° F. to about 3000° F. are generated.

Unfortunately, such high temperatures tend to cause the production of thermal NOx, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F., as well as gas turbines and diesel engines.

Nitrogen oxides are troublesome pollutants which are found in the combustion streams of boilers when fired as described above, and comprise a major irritant in smog. It is further believed that nitrogen oxides can undergo a process known as photochemical smog formation, through a series of reactions in the presence of some hydrocarbons. Moreover, nitrogen oxides comprise a significant contributor to acid rain and have been implicated as contributing to the undesirable depletion of the ozone layer. They may also impact on the warming of the atmosphere commonly referred to as "the greenhouse effect". In addition, some or all of these effects are believed to be attributable to nitrous oxide.

Recently, many processes for the reduction of NOx in combustion effluents have been developed. They can generally be segregated into two basic categories: selective and non-selective. The selective processes are more desirable because of economic considerations. Among selective nitrogen oxides reducing processes, there is a further division between selective catalytic reduction (SCR) and selective non-catalytic reduction (SNCR) processes. Although SCR processes are thought capable of achieving higher levels of nitrogen oxides reductions, SNCR processes are often preferred because of their greater economy and flexibility.

SNCR processes, which are temperature dependent, generally utilize a nitrogenous substance such as urea or ammonia, as well as non-nitrogenous substances included as "enhancers" for the nitrogenous substances, and proceed in the gas phase by a complex series of free radical-mediated chemical reactions. Such reactions involve various nitrogen, hydrogen, oxygen, and carbon-containing species and radicals. Urea and ammonia differ, in that they appear to be most effective at different temperatures.

Unfortunately, it has recently been found that many nitrogenous substances, when introduced into a combustion effluent, have a temperature window (that is, an effective effluent temperature range within which NOx reductions are high) which is not sufficiently broad to remain effective when the system being treated experiences frequent load swings and/or multiple fuel switching, or when only short chemical residence times are available.

In addition, since NOx emissions comprise a small amount of the total flue gas volume (e.g., about 100 parts per million (ppm) to about 1500 ppm), 100% chemical efficiency is unlikely to be achieved. Rather, chemical efficiency significantly less than 100% is expected. Chemical efficiency is, in practical terms, most conveniently expressed as normalized stoichiometric ratio (NSR), a measure of the molar ratio of the nitrogen oxides reducing moiety to nitrogen oxides in the effluent. An NSR of 1 represents the stoichiometry theoretically required to remove 1 mole of NO according to the corresponding chemical reaction. The NSR, therefore, for urea or ammonia is often required to be from 1.5 to 2.5 to obtain most NOx control requirements. Moreover, to achieve satisfactory nitrogen oxides reductions uniform and continuous distribution of the treatment chemical throughout the flue gas is needed.

As a result, when effluent conditions change, the treatment agent may actually lead to the production of undesirable byproducts such as ammonia (called ammonia slip or breakthrough) and carbon monoxide. This inefficient use of the treatment chemical can also lead to the generation of nitrous oxide ($N_2O$). Nitrous oxide, which is defined differently than NOx for regulatory purposes, is coming to be recognized as a pollutant, albeit secondary to nitric oxide (NO) and nitrogen dioxide ($NO_2$).

Urea is generally considered the most desirable NOx reducing species because of its effectiveness and relatively broad temperature window, as well as its non-toxic and environmentally benign nature, when compared with ammonia. Urea, it is believed, breaks down in the effluent into the amidozine radical ($NH_2$), which appears to be the moiety responsible for the reduction of NOx. However, urea can, under certain conditions, also break down into cyanuric or isocyanic acid according to the following reaction formula

$$2NH_2CONH_2 + OH \rightarrow 3NH_2 + HOCN \text{ (or HNCO)} + H_2O + CO$$

The amidozine radical can then proceed to reduce NOx according to the following reaction pathway

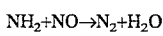

$$NH_2 + NO \rightarrow N_2 + H_2O$$

but the cyanuric or isocyanic acid produced can then proceed further to form nitrous oxide and carbon monoxide or molecular nitrogen and carbon dioxide when combined with NOx according to the following set of reactions $$HOCN \text{ (or HNCO)} + OH \rightarrow NCO + H_2O$$

$$NCO + NO \rightarrow N_2O + CO$$

$$NCO + NO \rightarrow N_2 + CO_2$$

When ammonia, carbon monoxide, or nitrous oxide is formed, the effectiveness of urea is somewhat decreased, although NOx is being substantially reduced, because of the formation of secondary by-products.

Recently, it has been found that the use of the hydrolysis products of urea are uniquely effective at reducing nitrogen oxides, with reduced emission of other pollutant species, as taught by von Harpe, Pachaly and Hofmann in U.S. Pat. No. 5,240,688 and von Harpe, Pachaly, Lin, Diep and Wegrzyn in International Patent Application entitled "Nitrogen Oxides Reduction Using a Urea Hydrolysate", having Publication No. WO 92/02450, filed on Aug. 1, 1991.

It is important to the successful understanding of this invention to distinguish between the hydrolysis products of urea and the decomposition products of urea. Urea can thermally decompose to biuret and isocyanic acid at temperatures between about 302° F. and 440° F. with a concomitant major weight loss. From there, the decomposition proceeds to cyanuric acid and isocyanic acid at temperatures of about 450° F. to 620° F. Under the proper conditions, however, urea hydrolyzes to products which are believed to include ammonia ($NH_3$), ammonium carbamate ($NH_2COONH_4$) ("carbamate"), ammonium carbonate (($NH_4)_2CO_3$) ("carbonate"), and ammonium bicarbonate ($NH_4HCO_3$) ("bicarbonate"). Hydrolysis generally continues sequentially from carbamate, through carbonate and then to bicarbonate, each hydrolyzed product being slightly more stable than the previous one.

Although each of the noted hydrolysis products is individually commercially available, it is more desirable to produce them via urea hydrolysis. This is because the thusly formed hydrolysate has advantages over the individual hydrolysis products, even if combined in the same approximate ratios. One advantage is cost, since urea can be significantly less expensive than the individual hydrolysis products. Additionally, a maximum solubility of about 25% for the hydrolysate (based on initial urea concentration) has been observed, which is superior to the solubility of bicarbonate, i.e., about 18%. This can be significant in terms of transportation costs and final treatment agent concentrations.

According to solubility and structural analyses, including high performance liquid chromatography (HPLC) using phosphoric acid as solvent; carbon-13 nuclear magnetic resonance spectroscopy (NMR); thermal gravimetric analysis (TGA); differential scanning calorimetry (DSC); and measurement of "P" or "M" alkalinity by acid titration, the hydrolysate prepared comprises at least in part a single unique structure of carbonate and bicarbonate which is in a complex with carbamate (expressed as carbamate.bicarbonate/carbonate). In addition, depending on the conditions employed, residual urea may also be present.

Although a urea solution will hydrolyze under ambient conditions, typically less than 1% will do so, an insignificant amount in terms of nitrogen oxides reductions. In forming the hydrolysate, temperature, pressure, concentration of the initial urea solution, and residence time were all believed to be important parameters, and must be balanced. High pressure was felt to be particularly useful because the reaction proceeds in the direction of smaller mole volumes during the formation of carbamate and carbonate. Higher temperature and longer residence times also result in higher levels of hydrolysis. However, under equivalent pressures, temperatures and residence times, hydrolysis decreases with increases in solution concentration.

Hydrolysis of a 10% aqueous urea solution was conducted under pressures sufficiently high to maintain the resulting hydrolysate in solution. Such pressures also facilitate hydrolysis. Hydrolysis was performed under pressures of at least about 500 pounds per square inch (psi), more preferably at least about 650 psi. If it was desired to maintain ammonia in solution, the pressure was to be at least about 750 psi. As the concentration of the initial urea solution is increased, the pressure was increased to achieve equivalent results.

There was not believed to be any true upper limit of pressure in terms of facilitating hydrolysis; rather, any upper limits comprise practical as opposed to technical limits, since higher pressures, i.e., pressures above about 3000 psi, require vessels able to stand such pressures, which are generally more expensive and usually unnecessary.

Unfortunately, the need to conduct hydrolysis under pressure meant that pressurized containers or conduits had to be employed. This meant increased equipment and other costs, reducing processing efficiency and practicability.

BACKGROUND ART

Processes and compositions for the reduction of nitrogen oxides in a combustion effluent have been developed extensively over recent years. With the increased attention to the health risks and environmental damage caused by agents such as smog and acid rain, it is expected that NOx reduction research will continue to be pursued.

In an early application of the use of nitrogenous treatment agents to reduce nitrogen oxides, Lyon in U.S. Pat. No. 3,900,554, describes a process for reducing nitrogen monoxide (NO) from combustion effluents by introducing ammonia or certain "ammonia precursors" into the effluent at temperatures which range from 1300° F. to 2000° F. In U.S. Pat. No. 4,208,386, Arand, Muzio, and Sotter improve on the Lyon process by teaching the introduction of urea for NOx reduction in oxygen-rich effluents at temperatures in the range of 1600° F. to 2000° F., when urea is introduced into the effluent alone, and 1300° F. to 1600° F. when urea is introduced with an ancillary reducing material. Arand, with Muzio and Teixeira, also teach the introduction of urea into fuel-rich combustion effluents to reduce nitrogen oxides at temperatures in excess of about 1900° F. in U.S. Pat. No. 4,325,924.

More recently, in a unique application of NOx reducing principles, Epperly, Peter-Hoblyn, Shulof, Jr., and Sullivan, in U.S. Pat. No. 4,777,024, teach a method for achieving substantial nitrogen oxides reductions while minimizing the production of so-called secondary pollutants, such as ammonia and carbon monoxide, through a multiple stage injection process. Moreover, Epperly, O'Leary, and Sullivan, in U.S. Pat. No. 4,780,289, have disclosed a complementary process for achieving significant, and potentially maximized, NOx reductions while minimizing the production of secondary pollutants. This process proceeds by utilizing the nitrogen oxides reduction versus effluent temperature curve of the treatment regimen being effected at each NOx reduction introduction in a combustion system.

In U.S. Pat. No. 4,861,567, Heap, Chen, McCarthy, and Pershing have disclosed a process which involves decomposing cyanuric acid in a fuel rich zone at 1000° F. to form isocyanic acid and other products, which are then introduced into a combustion effluent for the reduction of nitrogen oxides and sulfur oxides ($SO_x$). Furthermore, Azuhata, Kikuchi, Akimoto, Hishinuma, and Arikawa indicate in U.S. Pat. No. 4,119,702 that $NO_x$ reductions can be achieved at lower temperatures (i.e., 200° C. to 800° C.) by facilitating the decomposition of urea to NOx-reducing radicals by injecting an oxidizing agent with urea.

In addition, Hofmann, Sprague, and Sun have disclosed in U.S. Pat. No. 4,997,631 that the introduction of ammonium carbamate into an effluent can achieve substantial nitrogen oxides reductions while avoiding the presence of nitrous oxide.

Schell, in U.S. Pat. Nos. 4,087,513 and 4,168,299, discloses processes for the hydrolysis of urea to ammonia and carbon dioxide to eliminate urea from the waste water stream formed during urea production. These processes involve introducing the waste water stream into a carbon dioxide recovery system, optionally in the presence of vanadium pentoxide.

These patents, though, do not suggest the use of urea hydrolysis products for nitrogen oxides reduction, and especially not the use of a unique urea hydrolysate for NOx reduction.

Although as discussed above, U.S. Pat. No. 5,240,688 and International Publication No. WO 92/02450 discuss the use of the hydrolysis products of urea for nitrogen oxides reduction, both indicate the need for the application of pressure during hydrolysis. Neither one suggests that hydrolysis can be effected under low pressure, even within the effluent.

What is desired, therefore, is a system whereby nitrogen oxides reductions can be achieved using the hydrolysis products of urea, without the need for the application of pressure during hydrolysis. Also desired are a wider temperature window of NOx reduction, lower CO formation, $N_2O$ generation and $NH_3$ slip, and higher chemical utilization. This process should exhibit flexibility with reaction kinetics and residence time.

DISCLOSURE OF INVENTION

The present invention relates to the reduction of nitrogen oxides using the hydrolysis products of urea in an SNCR reaction, which are effective at NOx reduction while avoiding the disadvantages of art-recognized SNCR processes. These hydrolysis products can be formed under reduced pressure conditions, and even after introduction of a urea solution into an effluent stream.

The use of such hydrolysis products has been found to achieve nitrogen oxides reductions generally greater under certain conditions than those achievable by the use of urea or ammonia with reduced byproduct emissions, higher utilization and greater flexibility. The inventive process also avoids the undesirable need for the storage and handling of ammonia.

BEST MODE FOR CARRYING OUT THE INVENTION

As noted, the present invention relates to the formation of the hydrolysis products of urea without the need for application of increased pressure. In doing so, the installation and maintenance of high pressure conduits or other equipment is avoided. In fact, the formation of the desired NOx-reducing moieties can occur after injection of the "raw material" urea solution into the effluent.

In order to permit this "low pressure" urea hydrolysis, the aqueous urea solution to be hydrolyzed further includes a hydrolysis agent which comprises a water soluble transition metal, alkali metal or alkaline-earth metal compound, such as an oxide or hydroxide, or the chloride, sulfate, sulfite, nitrate or phosphate salts of transition metals, alkali metals or alkaline-earth metals, or mixtures thereof. Included among suitable agents are potassium hydroxide (KOH), sodium hydroxide (NaOH) calcium formate ($Ca(COOH)_2$) and/or magnesium formate ($Mg(COOH)_2$).

Although the exact mechanism for the action of the hydrolysis agent is not fully understood, it is thought that the hydrolysis agent "associates" with the urea and promotes hydrolysis, even in the absence of high pressure. Water solubility of the hydrolysis agent, therefore, is believed to be important in initiating and maintaining the association between the hydrolysis agent and urea, even after water evaporation.

The hydrolysis agent should be present at a molar ratio of hydrolysis agent to urea of about 0.1:1 to about 2:1, more preferably about 0.2:1 to about 1.5:1 (for instance, in the case of sodium hydroxide, it should be present in the solution at a weight ratio to urea of about 0.133:1 to about 1:1).

By the inclusion of the hydrolysis agent, the need for the application of pressure during hydrolysis is reduced or eliminated. Accordingly, the hydrolysis agent-containing aqueous urea solution can be introduced into the effluent prior to hydrolysis, with the same beneficial effects as if hydrolysis had been effected prior to entry into the effluent. Although the precise reason for this is not fully understood, it is believed that formation of the NOx-reducing moieties occurs in solution and/or immediately after water evaporation, when the droplets of solution have entered the effluent. Because the effect observed is that of the urea hydrolysis products, not urea itself, the postulated mechanism is believed likely.

Under prior hydrolysis reactions, the specific temperatures and residence times for hydrolysis had to be carefully controlled to ensure sufficient degree of hydrolysis. If relatively little hydrolysate was needed (i.e., no more than about 5%), temperatures of about 250° F. were all that were necessary, whereas temperatures of about 600° F. to 700° F. were required to ensure that virtually all the urea had been converted to hydrolysate. However, since the effluent temperature is generally significantly higher at the point of introduction of the solution (i.e., above about 1300° F.), insufficient hydrolysis is eliminated as a problem. Residence times for hydrolysis generally varied between about 3 minutes and about 14 minutes, but at the elevated temperatures of the effluent much shorter residence times (i.e., less than 1 second) have been found to be just as effective, and will produce virtually complete hydrolysis. It will be recognized that an upper residence time limit is less important since exceeding it will not result in lower levels of hydrolysis or a less effective hydrolysate, it is believed.

The temperature and residence time for urea hydrolysis are related, and one (i.e., time) can be decreased as the other (i.e., temperature) is increased. Again, this may be insignificant since, at the temperature of the effluent, virtually complete hydrolysis is expected.

Since the inventive hydrolysate is formed within the effluent, the urea solution should comprise sufficient urea to provide the desired level of hydrolysate for substantial reduction of nitrogen oxides under the effluent and load conditions existing. Advantageously, the urea solution comprises up to about 50% urea by weight, more preferably about 5% to about 45% urea by weight. Most preferably, the solution comprises about 10% to about 25% urea by weight, with the appropriate amount of hydrolysis agent to provide the molar ratios discussed above.

The aqueous solution from which the hydrolysate is to be formed can be introduced into the effluent by suitable introduction means under conditions effective to produce the desired NOx-reducing moieties and reduce the effluent nitrogen oxides concentration in a selective, non-catalytic, gas-phase process. Suitable introduction means include injectors, such as those disclosed by Burton in U.S. Pat. No. 4,842,834, or DeVita in U.S. Pat. No. 4,915,036, the disclosures of each of which are incorporated herein by reference. One preferred type of injection means is an injection lance, especially a lance of the type disclosed by Peter-Hoblyn and Grimard in International Publication WO 91/00134, filed Jul. 4, 1989, entitled "Lance-Type Injection Apparatus for Introducing Chemical Agents into Flue Gases", the disclosure of which is incorporated herein by reference.

Generally, the solution is introduced into the effluent to be treated for NOx reduction to produce an amount of the urea hydrolysis products effective to elicit a reduction in the nitrogen oxides concentration in the effluent. Advantageously, the solution is introduced into the effluent in an amount sufficient to provide a molar ratio of the nitrogen contained in the solution to the baseline nitrogen oxides level (by which is meant the pre-treatment level of NOx in the effluent) of about 1:5 to about 10:1. More preferably, the solution is introduced into the effluent to provide a molar ratio of solution nitrogen to baseline nitrogen oxides level of about 1:3 to about 5:1, most preferably about 1:2 to about 3:1.

In another related embodiment, the hydrolysis solution is used to provide ammonia to facilitate the catalyzed reduction of NOx (in an SCR process). In such cases (or in any situation where a catalyst bed is installed in the effluent path downstream from the hydrolysis solution introduction), it is desirable to include an electrostatic precipitator or other means of particle collection in the effluent pathway upstream from the catalyst, to avoid fouling or other catalyst damage which can occur when metal salts remain in the effluent. The appropriate conditions for the production of ammonia to facilitate the catalyzed reduction of nitrogen oxides are described in U.S. Pat. No. 4,978,514 to Hofmann, Sun and Luftglass, U.S. Pat. No. 5,139,754 to Luftglass, Sun and Hofmann, and U.S. Pat. No. 5,286,467 to Sun, Hofmann and Lin, the disclosures of each of which are incorporated herein by reference.

The hydrolysis agent-containing, aqueous urea solution is preferably injected into the effluent gas stream at a point where the effluent is at a temperature above about 1300° F., more preferably above about 1400° F. Large industrial and circulating fluidized bed boilers of the types employed for utility power plants and other large facilities will typically have access only at limited points. In the most typical situations, the boiler interior in the area above the flame operates at temperatures which at full load approach 2200° F., even 2300° F. After subsequent heat exchange, the temperature will be lower, usually in the range between about 1300° F. and 2100° F. At these temperatures, the flexibility and broad temperature window of the urea hydrolysis products (which term is meant to include the unique hydrolysate described above) can effectively accomplish substantial reduction of nitrogen oxides in the effluent without the drawbacks of prior art processes.

Optionally, the hydrolysis products can be enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, molasses, sugar, 5- or 6-membered heterocyclic hydrocarbons having at least one cyclic nitrogen such as pyridine and pyrolidine, hydroxy amino hydrocarbons such as milk or skimmed milk, amino acids, proteins, and monoethanolamine and various other compounds which are disclosed as being effective at reducing nitrogen oxides in an effluent. These "enhancers", which are preferably present in an amount of about 0.5% to about 25% by weight when employed, function to lower the effluent temperatures at which hydrolysate achieves its peak reductions of NOx.

Such enhancers as well as others which may be suitable are disclosed in, for instance, U.S. Pat. Nos. 4,751,065; 4,927,612; 4,719,092; 4,888,164; 4,877,591; 4,803,059; 4,844,878; 4,873,066; 4,770,863; 4,902,488; 4,863,704; 4,863,705; and International Patent Application entitled "Composition for Introduction into a High Temperature Environment", Publication WO 89/10182, filed in the names of Epperly, Sprague, and von Harpe on Apr. 28, 1989, the disclosures of each of which are incorporated herein by reference.

When the solution is introduced without a non-nitrogenous hydrocarbon enhancer, it is preferably introduced at an effluent temperature of about 1500° F. to about 2100° F., more preferably about 1550° F. to about 2100° F. When the solution also comprises one of the enhancers discussed above, it is preferably introduced at an effluent temperature of about 1300° F. to about 1700° F., more preferably about 1400° F. to about 1600° F. or higher. The usefulness of introduction of the solution at these effluent temperatures can depend on the particular components of the treatment agent (i.e., solution) and other effluent conditions, such as the effluent oxygen level.

The effluent into which the urea solution of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

The use of the inventive urea solution for NOx reduction according to the process of the present invention can be a part of a multi-stage treatment regimen which will reduce effluent nitrogen oxides. Such processes are discussed in, for instance, U.S. Pat. Nos. 4,777,024 and 5,057,923, the disclosures of each of which are incorporated herein by reference. For instance, in a first stage of such a process, NOx is reduced using the urea hydrolysis products as described above. In a second stage, a urea or ammonia solution (without hydrolysis agent) can be introduced. In the alternative, the first stage can comprise a urea or ammonia solution, and the second stage a hydrolysis solution. By doing so, the advantages of the use of the hydrolysis products are maximized.

The use of urea hydrolysis products to reduce nitrogen oxides in a combustion effluent, especially when compared with the use of urea or ammonia, has been found to provide several important advantages. At lower effluent temperatures (i.e., below about 1700° F.), higher reductions of nitrogen oxides are observed with greater chemical utilization, and lower NSR requirements. The hydrolysis products, especially the noted hydrolysate, has a wider temperature window with lower ammonia slip at effluent temperatures greater than about 1600° F., and reduced generation of nitrous oxide and emission of carbon monoxide. The kinetic flexibility of the hydrolysate is superior, with equivalent or better performance at shorter residence times. Moreover, the hydrolysate comprises virtually all volatiles, with no solids residue.

The widened temperature window of the hydrolysis products is believed to be due to the presence of different components (i.e., carbamate, carbonate, bicarbonate, ammonia, and residual urea), each of which have different reaction kinetics. Since the compositions are "released" for NOx reduction at different times, with ammonia and bicarbonate more kinetically reactive, followed in order of reactivity by carbonate, carbamate and urea, the effective temperature window is wider than any of the individual components.

In addition, the advantages of the hydrolysis products are thought to be due to its lower thermal stability and increased alkalinty/basicity/electrophilicity as compared with urea. For reasons not yet determined, hydrolysis products formed in a catalyzed hydrolysis reaction is more kinetically reactive than hydrolysis products produced without a catalyst.

The use of the present invention to reduce nitrogen oxides in an effluent by the hydrolysis of urea within the effluent is as illustrated by reference to the following example:

EXAMPLE I

The apparatus employed is a combustor, called a "Flame Tube", which was designed to simulate conditions found in real-time industrial and utility boilers. The combustor has many refractory-lined sections. Total furnace volume is 10 cubic feet with about half of its volume forming a combustion chamber. The combustion chamber has an inner diameter of 15 inches and is a 48 inch long cylindrical section. The test section is maintained at isothermal temperatures for chemical reactions. Combustion air and furnace draft are controlled by a variable speed ID fan. Typical firing conditions are as follows:

| | |
|---|---|
| Fuel = | No. 2 fuel oil |
| Maximum Firing = | 250,000 Btu/hr |
| % $O_2$ = | 3–10% |
| Residence Time = | 0.3 sec at NSR of 1 and 0.7 sec at NSR of 2 |
| Temperatures = | 1200–2100° F. at 50° F. increments |

A diagnostic system provides two main functions: (1) Flue gas analyses, and (2) Automatic data acquisition. Combustion gases are monitored for NOx, CO, $O_2$, $N_2O$ and $NH_3$. A flue gas sample is drawn continuously from the furnace exit by a vacuum pump to the gas conditioning unit, followed by analyzers. The NOx analyzer used is a Model 10B chemiluminescent NO-NOx gas analyzer from Thermo Electron. The CO analyzer used is a Model 48 infrared CO Analyzer from Thermo Electron. The $O_2$ is analyzed by a Model 326 Analyzer from Teledyne Analytical Instruments which utilizes a micro-fuel cell. A Perkin-Elmer Gas Chromatography Model 8410 equipped with an Electron Capture Detector (ECD) is used to analyze $N_2O$ via an automatic gas sampling valve. Ammonia measurements are performed by wet chemical methods. The procedure involves absorption of gaseous $NH_3$ in a given volume of acidic solution. The concentration of $NH_3$ is determined by means of direct potentiometry with an $NH_4^+$ ion-selective electrode.

Effluent baseline pollutant values are determined prior to testing while injecting deionized water in an amount equivalent to treatment agents to be injected. Temperature at the location for injection is determined using a suction pyrometer and type R thermocouple. The temperature at the point of the injection nozzle is calculated by extrapolation of the temperature values from downstream points.

The furnace is fired at a fuel feed rate of 1.6 gph using #2 oil and an excess $O_2$ of 7%. The baseline NOx was determined to be about 225 ppm.

Four separate solutions were introduced into the effluent. They are as follows:

Solution A: 10% aqueous solution of urea without hydrolysis agent.

Solution B: 10% aqueous solution of urea containing potassium hydroxide at a 1:1 molar ratio.

Solution C: 10% aqueous solution of urea containing sodium hydroxide at a 1:1 molar ratio.

For each run and baseline the NSR, temperature at the point of introduction, amount of NOx, percent reduction of NOx, $N_2O$, $NH_3$, and CO are indicated.

TABLE I

| | NSR | Temp (°F.) | NOx (ppm) | % Red. | $N_2O$ (ppm) | $NH_3$ (ppm) | CO (ppm) |
|---|---|---|---|---|---|---|---|
| Baseline | — | 1700 | 225 | — | 1.0 | 2 | 0 |
| A | 1 | 1700 | 122 | 46 | 17.0 | 14 | 2.2 |
| B | 1 | 1700 | 82 | 64 | 17.6 | 5 | 1.5 |
| Baseline | — | 1600 | 222 | — | 1.0 | 2 | 0 |
| A | 2 | 1600 | 112 | 54 | 17.0 | 76 | 11.0 |
| B | 2 | 1600 | 39 | 82 | 16.1 | 90 | 12.0 |
| C | 2 | 1600 | 42 | 81 | 13.7 | 88 | 10.0 |
| Baseline | — | 1700 | 225 | — | 1.0 | 2 | 0 |
| A | 2 | 1700 | 65 | 71 | 37.0 | 36 | 10.5 |
| B | 2 | 1700 | 27 | 88 | 18.0 | 61 | 3.0 |
| C | 2 | 1700 | 42 | 81 | 19.0 | 55 | 2.6 |
| Baseline | — | 1850 | 225 | — | 1.0 | 2 | 0 |
| A | 2 | 1850 | 28 | 88 | 40.0 | 17 | 3.2 |
| B | 2 | 1850 | 22 | 90 | 5.0 | 29 | 1.4 |
| C | 2 | 1850 | 60 | 72 | 8.0 | 26 | 0.6 |
| Baseline | — | 1700 | 240 | — | 1.0 | 2 | 0 |
| A | 3 | 1700 | 31 | 87 | 45.0 | 127 | 17.0 |
| B | 3 | 1700 | 21 | 91 | 19.0 | 183 | 8.0 |
| C | 3 | 1700 | 10 | 96 | 12.0 | 149 | 7.0 |

It will be noted that at each temperature and NSR, the mixture of urea with the claimed hydrolysis agents has advantages in NOx reduction and/or the reduction of the production of secondary pollutants, $N_2O$, $NH_3$ and CO over both a urea solution without hydrolysis agent or a urea solution having monosodiumglutamate.

It is to be understood that the above example is given by way of illustration only and are not to be construed as limiting the invention.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. For conciseness, several conventions have been employed with regard to listings of chemicals and ranges. The listings of chemicals entities throughout this description are meant to be representative and are not intended to exclude equivalent materials, precursors or active species. also, each of the ranges is intended to include, specifically, each integer, in the case of numerical ranges, and each species, in the case of chemical formulae, which is encompassed within the range. The claims are meant to cover the claimed components and steps in any sequence which is effective to meet the objectives there intended, unless the context specifically indicates the contrary.

We claim:

1. A process for the reduction of nitrogen oxides in a combustion effluent, the process comprising introducing an aqueous solution which comprises urea and a water soluble hydrolysis agent in an amount effective to reduce or eliminate the need for pressure during hydrolysis which comprises an alkali metal oxide, an alkali metal hydroxide, calcium formate, magnesium formate, or mixtures thereof, into the effluent at an effluent temperature at the point of introduction of at least about 1300° F. under conditions effective to reduce the nitrogen oxides concentration therein.

2. The process of claim 1, wherein said hydrolysis agent is present in a molar ratio of hydrolysis agent to urea of about 0.1:1 to about 2:1.

3. The process of claim 2, wherein said hydrolysis agent is selected from the group consisting of potassium hydroxide, sodium hydroxide, and mixtures thereof.

4. The process of claim 3, wherein the hydrolysis agent comprises sodium hydroxide present at a weight ratio to urea of about 0.133:1 to about 1:1.

5. The process of claim 1, wherein the aqueous solution comprises up to about 50% urea by weight.

6. The process of claim 5, wherein the aqueous solution comprises about 10% to about 25% urea by weight.

7. The process of claim 1, wherein the effluent temperature at the point of introduction is between 1300° F. and 2100° F.

8. The process of claim 1, wherein said urea solution further comprises an enhancer selected from the group consisting of hexamethylenetetramine, oxygenated hydrocarbons, ammonium salts of organic acids, heterocyclic hydrocarbons having at least one cyclic oxygen, molasses, sugar, five- or six-membered heterocyclic hydrocarbons having at least one cyclic nitrogen, hydroxy amino hydrocarbons, and mixtures thereof.

9. The process of claim 8, wherein said enhancers are present in an amount of about 0.5% to about 25% by weight.

10. The process of claim 1, wherein the effluent has a baseline nitrogen oxides level and further wherein said solution is introduced into the effluent in an amount sufficient to provide a molar ratio of the nitrogen contained in the solution to the baseline nitrogen oxides level of about 1:5 to about 10:1.

11. The process of claim 10, the molar ratio of the nitrogen contained in the solution to the baseline nitrogen oxides level is about 1:2 to about 3:1.

12. The process of claim 1, wherein the solution is introduced into the effluent under conditions effective to produce ammonia to facilitate the catalyzed reduction of nitrogen oxides via a nitrogen oxides reduction catalyst.

13. The process of claim 12, wherein a means for particle collection is disposed in the effluent pathway upstream from the nitrogen oxides reduction catalyst.

* * * * *